US005771176A

United States Patent [19]

Froehlich et al.

[11] Patent Number: 5,771,176

[45] Date of Patent: Jun. 23, 1998

[54] PROCESS AND APPARATUS FOR ENHANCEMENT FOR SECURITY IN A MECHANICAL LOCK ENVIRONMENT (DPN-1)

[76] Inventors: Phillip E. Froehlich, 1373 Bay St., San Francisco, Calif. 94123; Edward E. Barker, III, 1531 Custis Ct., Atlanta, Ga. 30338; David R. Ross, P.O. Box 552, Stratford, Conn. 06497

[21] Appl. No.: 708,082

[22] Filed: Sep. 3, 1996

[51] Int. Cl.[6] .............................. G06K 9/78; G06K 9/00

[52] U.S. Cl. .................. 364/505; 364/550; 364/709.11; 364/709.05; 364/709.06; 340/825.31; 340/825.3; 340/825.34; 382/152; 382/194; 382/209; 70/277; 70/285; 235/382; 235/490; 235/454; 235/458

[58] Field of Search .................................. 364/505, 550, 364/709.05, 709.06, 709.11; 340/825.3, 825.31, 825.34, 835.36, 835.37, 825.49, 925.56, 825.97; 70/278, 277, 284, 285; 235/382.5, 382, 490, 487, 494, 445, 458, 454; 382/170, 174, 173, 171, 181, 194, 192, 203, 209, 217, 219, 224, 152

[56] References Cited

U.S. PATENT DOCUMENTS

| | | | |
|---|---|---|---|
| 4,712,103 | 12/1987 | Gotanda | 340/825.31 |
| 5,055,658 | 10/1991 | Cockburn | 235/382 |
| 5,073,949 | 12/1991 | Takeda et al. | 382/115 |
| 5,095,196 | 3/1992 | Miyata | 235/382 |
| 5,337,043 | 8/1994 | Gokcebay | 340/825.31 |
| 5,475,376 | 12/1995 | Chikamitue et al. | 340/825.31 |

*Primary Examiner*—James P. Trammell
*Assistant Examiner*—Tuan Q. Dam
*Attorney, Agent, or Firm*—David A. Roth

[57] ABSTRACT

This invention in its preferred embodiment comprises an apparatus and process (including a computer program) for controlling unmarked lock-opening keys in a security systems, whereby the conventional metal keys used to unlock rooms or cars or other entities can be controlled even though unmarked. The technique of the invention effectuates such control through taking electronic photographs, creating a silhouette of the side of unmarked keys using their individual configurations on the edge, generating an individual and distinctive electronic signal, specific for each such key to generate a digital coordinate series of numbers for each key and inventorying each such identifying signal representing a key so that keys are recognized by these signals rather than numbers or codes marks on the key. Although marked keys can be utilized in such a system, it would be a waste of the identifying ability of the invention. Thus the greatest security benefits are obtained through the use of unmarked keys in the apparatus and process of the invention.

11 Claims, 4 Drawing Sheets

THE INVENTIVE SYSTEM (WITH CAMERA AND EL LAMP)

(B&W VIDEO CAMERA)

(EL LAMP WITH INVERTER ATTACHED)

(TAKE PICTURE)

(APERTURE PLATE CONTACTS)

PROCESS AND APPARATUS FOR ENHANCEMENT FOR SECURITY IN A MECHANICAL LOCK ENVIRONMENT (DPN-1)

BACKGROUND OF THE INVENTION

1. Field of the Invention

This invention in its preferred aspect relates to an apparatus and a process for obtaining enhanced security (at a pronounced economical advantage) in an existing system employing mechanical locks using keys. The invention comprises employing optical reading, utilizing machine vision technology in combination with certain inventive features. The invention electronically reads and identifies unlabeled conventional keys for such locks by identifying the individual shape peculiarities of each unmarked key in such system. It identifies each key over and over without ever visually labeling it. Finally it inventories each such key. The term key is used in the sense of a solid device, [with visual identifying features such as holes or teeth, and being comprised of plastic or metal ], that will cause a lock to open or close.

It is known in the machine vision industry to utilize the technology for such applications as checking fingerprints, and aligning bristles on small brushes used for eyelash cosmetics. But, the specific application of machine vision for identifying one or more unmarked and physically unidentifiable keys and inventorying them unmarked in a multiple key security system has not hitherto been know prior to this invention.

The invention will find application for enhancing key control security in such environments as new and existing hotels, car rentals, cruise ships, apartments, prisons, offices, factories, car dealers, postal boxes, safe deposit systems, locker systems (public storage), parts identification, car manufacturers, and other entities that use multiple mechanical locks in a security system.

2. Description of the Prior Art

This invention is an improvement of existing mechanical lock and security systems well known to the prior art. A security revolution is occurring in our society. Nowhere is it more prevalent than in industries such as hotels and apartments which rent or lease multiple units for a fee and provide keys for mechanical locks to the possessors of such rooms.

Because any keys that are not accounted for provide a security risk, hotels for instance are trying to minimize their legal liability by improving the security of their units. One such approach that has been widely adopted is to provide locks to doors which can only be activated and opened by unmarked cards that magnetically or electronically activate the lock. These cards are issued in an unmarked manner. So when a card is lost or stolen it is not readily apparent just which lock on which door can be opened.

These electronic/magnetic(EM) systems carry several inherent disadvantages.

One is expense. EM is a very expensive procedure, which only the most affluent host entities can afford. Another, is that they present a potential hazard, since the mechanism or card may be destroyed by heat with a concomitant safety hazard.

Thus, the mechanical key approach requires an identification system requiring the use of tags, imprints or encryption schemes so a key can be matched to a specific room When that key disappears, as is common, the possessor can have access to the room which it unlocks unless it is rekeyed. Rekeying is an expensive process and because of this is not commonly employed after a key disappears.

It would be more desirable and economically advantageous if existing mechanical/lock key systems could be readily adapted to a mode in which unmarked keys could be utilized. The use of unmarked keys in a mechanical system would greatly decrease (at a reasonable cost) the security problems caused by the common and frequent problem of missing keys, The present invention presents an economical and elegant process and apparatus for adopting existing mechanical lock/key systems to an unmarked key system. The keys and the locks remain unchanged (except the keys are unmarked) under the inventive system. Yet the inventive process and apparatus permits the controlled and facile use of totally unmarked and physically identified keys.

The apparatus and process of the invention provides a novel and unobvious identification system for keys allowing greatly improved security and inventorying while keeping or retaining existing door locks and standard keys. The invention comprises an unmarked key identification system that recognizes and electronically but invisibly labels individual keys and displays their corresponding room or lock assignments on an electronic display screen. Keys do not require any visible tags, imprints or encryption schemes The invention is utilizable with virtually all standard metal keys It can also be used with plastic cards which are punched in specific patterns.

Accordingly, the invention eliminates the requirements for key-encryption schemes, frequent changing of door lock hardware and extensive key producing equipment. Moreover, the apparatus of the invention is very simple and can be installed in one day. The process which is carried out on this apparatus is simple and can be easily learned by hotel or other service personnel.

SUMMARY OF THE INVENTION

The invention, in its simplest mode, comprises apparatus and process for both conveniently identifying and invisibly labeling physically unmarked and unlabeled keys by their specific physical configurations by using software to count and identify unmarked keys. This results in a mode of key identification and inventorying in a system that does not require keys to be marked with any identification. Thus, the key is identified solely through the mode of an electronic picture of the key's configuration of its sideview profile (silhouette) or of its other physical features, such as holes. The resulting totality of electronic signals generated from such picture provides a separate electronic key identity. This electronic identity is utilized in conjunction with appropriate inventorying software on a personal computer as part of the overall inventory of keys in any given installation, such as a hotel. All of this eliminates the need for any physical markings on a key to establish its correspondence with a lock such as to a room.

In essence, the invention comprises a desk top key identification system employing computer based machine vision technology. The invention "learns" keys by digitizing their profile and storing this numeric sequence by computer software in the storage system of the computer for later comparison and reporting. The inventive system provides a security envelope to establishments that issue metal keys. Keys are not required to be encrypted, marked, stamped or encased in a identifiable holder Thus anyone finding a lost or stolen key will not know its purpose, that is the location of the lock which it will open.

Also, the invention comprises an all-inclusive, desk top system( see FIG. 1). In the course of use, most all metal keys having a profile or rather the familiar saw tooth pattern on one or both top or bottom edges are inserted into a slot (aperture) on the front of the inventive assembly. Inserting a key therein results in the key being held rigid in a mechanical assembly that does not permit any key movement. When the key fully enters this assembly, electrical contacts are closed, triggering a small, embedded black & white video camera on one side of the key and an electro luminescence(EL) panel for back lighting on the other.

This allows the key's profile to be captured as an image in a video frame. The software program of the invention then automatically composes a unique numeric code based on the profile image. The numeric code is then compared to numeric codes previously stored in the database in a computer. If it finds a match, its pre-assigned alpha-numeric identification, such as a room number or name is displayed on an electronic display means, such as a LCD (Liquid crystal display). If the numeric profile code is not found, the operator is prompted by the LCD to add it to the database In this case, the operator will then enter an alpha numeric name or number for the "new" key through The invention's keyboard.

Another mode of operation allows the operator to display and print-out various statistics regarding the names or numbers of the keys in the database. Details such as all the keys in the data-base may be displayed or printed, The number of times the keys were issued, and whether or not they were returned are also examples of reports that can be generated by the process of he invention.

For diagnostic purposes, another mode of operation allows the operator to display the video sequence of the key insertion. This allows for observing such things as the alignment and cleanliness of the mechanical chamber.

The preferred inventive embodiment is an intelligent computer based system comprising apparatus, [that is adapted to sit on a desk] computer software instructions and embodies a process. An operator simply inserts an unmarked key into a slot in the apparatus and enters the room name or number assignment having the lock corresponding to this key, through a keyboard. The invention "learns" the key and remembers the assigned room It only takes seconds When any key is returned or found, a simple insertion into the aperture of the apparatus of the invention will display the assigned room number instantly.

The invention can be used to invisibly identify all unmarked keys, so that it can be known when a key is missing. But even when a key is missing, the security risk is greatly reduced over that when a marked key is missing.

The invention also comprises a key management and tracking system. With the built in database, any number of keys can he classified and tracked.

Detailed management reports can be displayed or printed. The invention can be used to effectuate missing key analysis, key usage trends, master reports, lock changes reports and the like Multi-tenant building security is faced with a dilemma for individual office/room protection. Until now solutions cost $ $200 to $ 2,000 per door, to relock, and issue new keys. For just a 100 room facility, that could equate to $200,000

The invention costs less than $ 5,000 in quantities. It provides unique security, security report generations and the advantage of keeping existing locks and key making equipment The inventive system can be installed, and operational in only a few hours.

No illustration of a frame grabber card to be installed in a personal computer for accepting signals from said picture signals has been provided since this is standard.

DESCRIPTION OF THE PREFERRED EMBODIMENTS

Further advantages of this invention will be apparent from the following detailed description. This invention was reduced to practice initially and in subsequent improved embodiments in accordance with a conceptual design framework that set important parameters deemed important to achieve commercial success in accordance with the considerations set forth above and below.

The system should be able to identify a key within less than five seconds from the initiation of the operation of the system. It must accept and read all keys common to the industry in which it is employed. It should have a cost of less than $8000.00 and accept one million key insertions.

The design concept of the invention comprises the generation of an electronic key silhouette, which is preferably done with a miniature solid state camera and a lamp operating in concert in a key receiving receptacle. When an unmarked key is inserted into the receptacle/orifice, which is constructed and adapted to accept it and hold it in a stable position. Insertion of the key activates a switch. This turns on the camera and the lamp simultaneously in order to obtain an electronic image (silhouette) of the side of the key, thus highlighting the varying projections and indentations on the side of the key e.g. the teeth.

The construction of the receptacle means of the invention embodies a solid structure with a top portion through which a slot for inserting a key is provided. As the key passes through the slot, it is received by a spring-loaded stabilizing device which keeps it from wiggling in any direction. The entry of the key also activates a switch which activates two other components, e.g. the lamp and the video camera.

These are a lighted screen, preferably an electrolumenesence lamp (EL Lamp). This latter type was found to be preferred because of their very long life, cool light and absence of hotshots which would distort key images.. The screen is configured so that the key is between it and the camera. This has the effect of highlighting the profile of any key inserted in the slot so that the camera can achieve a satisfactory electronic image, essentially a silhouette image of the longitudinal cross-section of a key.

This electronic image is passed on to a frame storing means, which in practice is a frame grabbing board obtained from ImageNation, with its associated software operatively included within a personal computer(PC). The PC preferably has the processing ability provided by a standard 486 math coprocessor, preferably with at least 4 meg ram, and preferably with at least a 50 meg hard drive and 3.5 inch floppy drive with appropriate standard keyboard and monitor.

THE MAJOR MECHANICAL COMPONENTS OF A PREFERRED EMBODIMENT OF THE INVENTION

Figure 2:
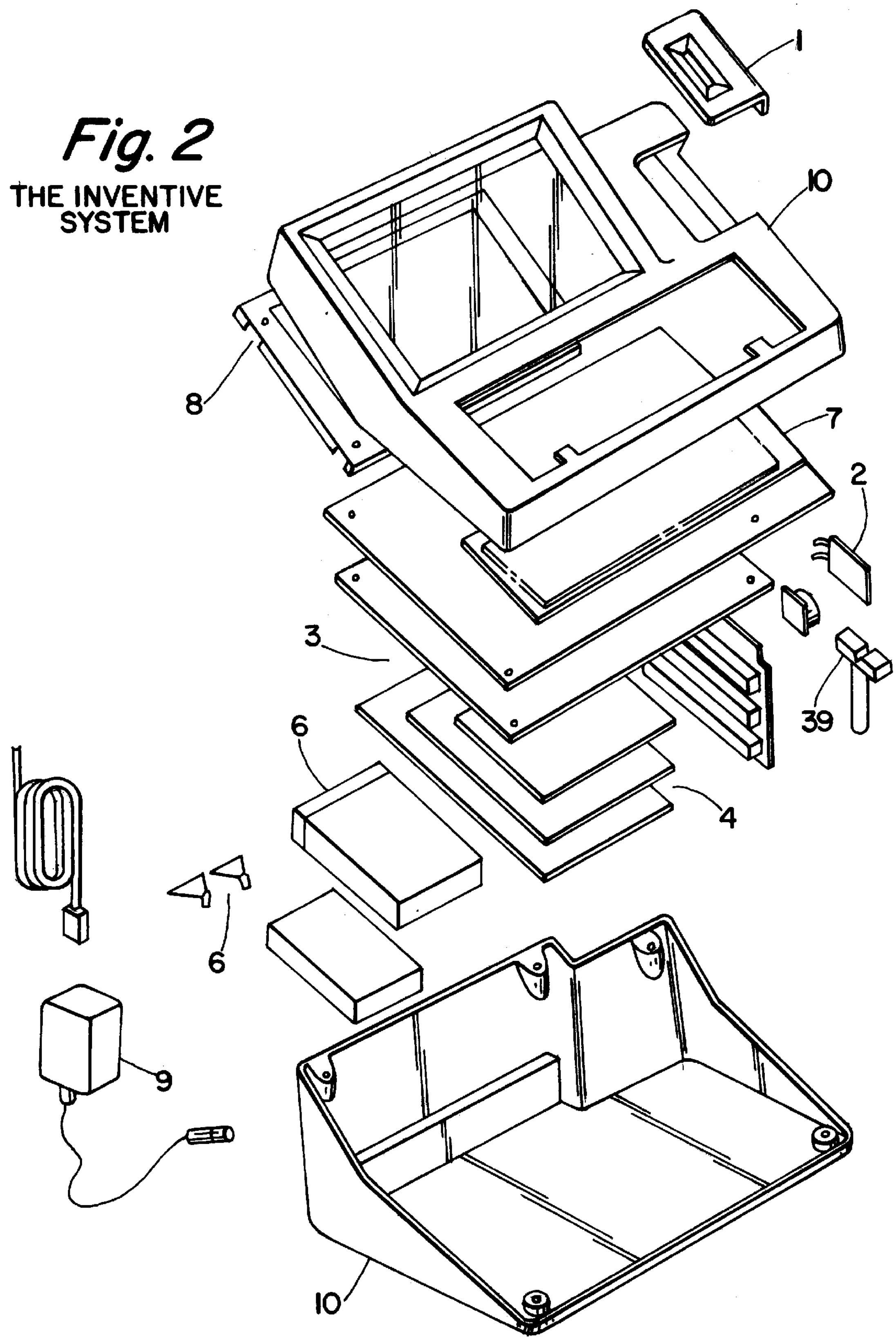
FIG. 2, is a cut away perspective of the inventive apparatus 30 of FIG. 1 showing various numbered elements and components thereof, all of which are more fully discussed infra.

In FIG. 2: The preferred apparatus of the invention is broken down into the major components as set forth below:

1. Mechanical section—The section where the key is inserted
2. Eletro-optical section—The section that illuminates the key and acquires the image
3. Computer Section—Defined as the "engine" of the system, CPU, memory etc.
   4, Frame storage—The electronic video-memory for holding the image
   5 Data storage—The hard drive where data is stored for retrieval. the
   6 Data Transfer—(1)The disk drive for allowing removal of data
   (2) A parallel port for the attachment of a printer
   (3) 3.5 inch disk drive for data back-up, transfer & new input
7. Data entry—The key-board, and/or touch screen display
8 Display—A LCD(Liquid Crystal Display) for viewing information Power supply—The device providing the electricity required to operate the system, 10 Housing—The framework and shell that hold and house the components of the system 11 Software—The list of electronic instructions telling the components of the system what to do, and in what sequence. The computer software for this invention is attached hereto, incorporated herein and made a part of this specification

PREFERRED ELECTRO-OPTICAL COMPONENTS AND ELEMENTS OF THE INVENTION

2 Electro-Optical Section

Figure 6:
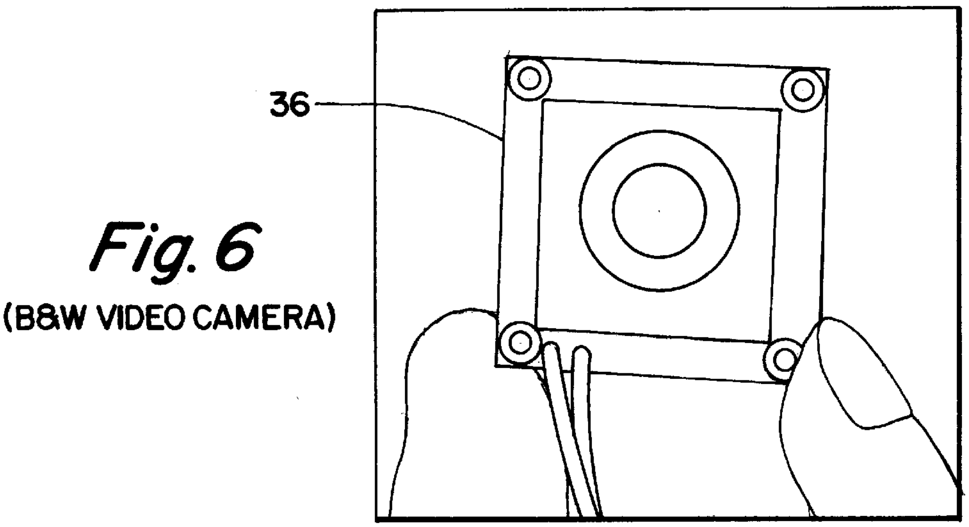
FIG. 6 is a photograph of the video camera 36 mounted in assembly 3.

The Video camera (36)takes black & white, miniature video image of key's profile(FIG. 6)

Figure 7:
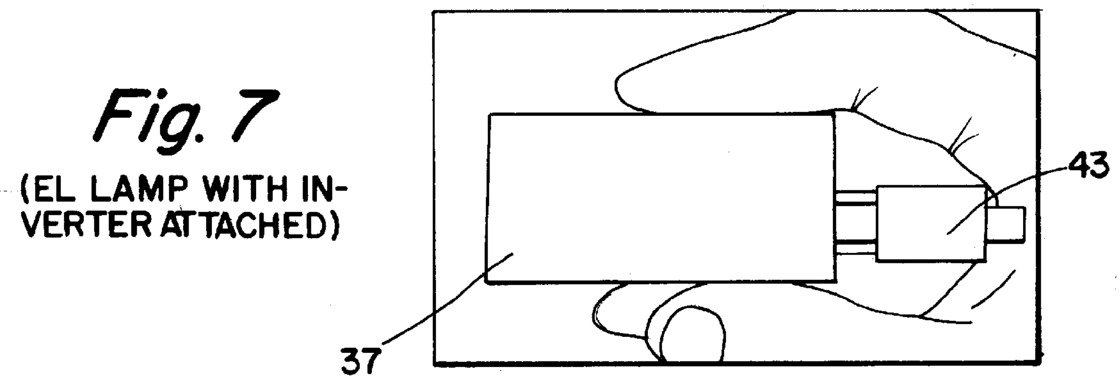
FIG. 7 is a photograph of EL Lamp 37 of the assembly 34 of FIG. 3.
Figure 8:
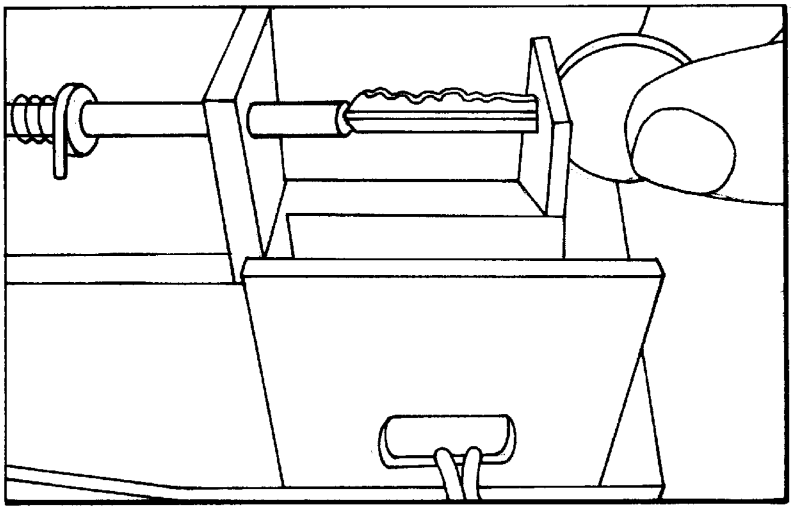
FIG. 8 is a photograph of assembly 34 showing a hand inserting key 33 into the key slot of assembly 34.
Figure 8A:
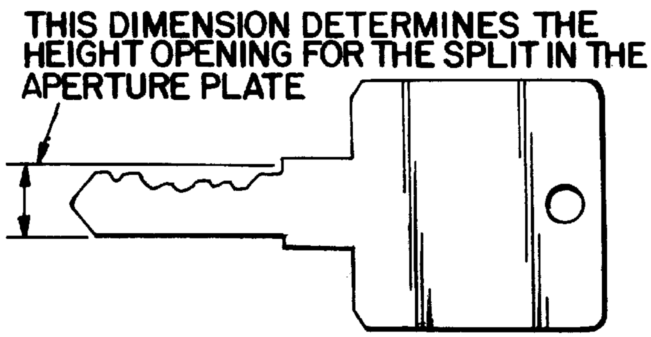
FIG. 8A is a silhouette view of key 40 showing the dimension determinations for the height and width dimensions of key slot 32 of of assembly 3.

The Electroluminescence(EL)lamp 37 (FIG. 7),Supplies uniform back lighting to key 40

The Inverter 43 for EL lamp (FIG. 7),Creates 115 v ac @ 400 Hz to run the EL lamp 37.

Aperture contacts 42*a* and 42*b* are electrical contacts triggered when key 40 is fully inserted in aperture 32 and stopped by plate 41.

Plunger microswitch 44 (not shown) located at the rear of plunger rod 35A is activated upon key 40 insertion into notch 38 to turn on EL lamp The electro-optical components 36, 37, 43, 44, 42*a* and 42*b* establish when and how key 40's profile's picture will be taken As key 40 is inserted into aperture 32, the plunger 35 begins to move thus activating micro switch 44, This switch 44 allows power to be supplied to the inverter 43, which, turns on the EL lamp 37. EL lamp 37 stays on until key 40 is extracted When the key 40 is fully inserted, a wide area of the base of key acts as a mechanical stop and also acts as a short to two small electrical contacts 42*a* and 42*b* located in the aperture plate 41 constructed and adapted to have electrical contact effectuated when key 40 is fully engaged with plate 41. When these contacts 42*a*/42*b* are shorted, it provides a signal to the keyboard encoder signaling a "ENTER" input, which the software interprets as the signal to activate the frame grabbing PC board 45 and record a computer image of the silhouette of key 40. The picture of the profile of key 40 has now, been taken and temporarily stored in the frame grabber PC board 45. Because the lighting is behind the key 40, and the mechanical chamber 46 of assembly 34 is dark, only the silhouette of key 40's profile will be seen by the camera 36.

3. Computer Section

The Components in this section comprise in combination:

A CPU - 486 or better main computer board (33 mhz or better) to control the inventive system operation The computer has at least 4 meg (preferably 8 meg) "on board" memory to hold current operating instructions as sequences are initiated from the electro/mechanical signals from processing key 40.

The computer section generally consists of "standard" state-of-the art and readily available computer components, In order to limit the over-all physical size of the inventive system, smaller sized components were selected for the apparatus of the invention. These are commonly found in Lap-Top computers.

4. Frame Grabber Section

A Frame Grabber printed circuit board card 45 (obtained from the Imagenation Company) acquires key 40's image from camera 36 and holds it as an electronic image in the computer The frame grabbing card 45 is not special. There are several standard commercially available frame grabber boards to choose from, A particular card different from that specified above may dictate that the software to activate such other card be written slightly differently than the one actually used herein.

5. Date Storage

A hard drive employing 50 Meg or better with random access memory of 4 megs or better is preferred for the purposes of this invention. It thus Allows for permanent data and software storage Generally any standard brand hard drive, as found in most any modern computer will suffice for the purposes of this invention. Random access memory consists of standard memory modules that simply plug into the computer Main board.

6. Data Transfer

A parallel port for the attachment of a printer is provided in the PC A. 3.5 inch disk drive is used for data back-up, transfer and new input All of the components used for data transfer are standard computer parts.

7. Data Entry

Figure 9:
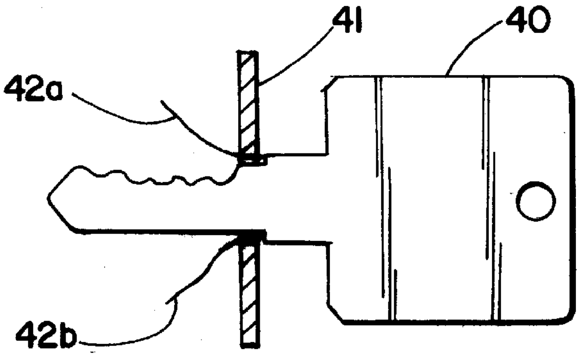
FIG. 9 is a view of key 40 in contact with metal key aperture wall 41 (also acting as a mechanical stop for an inserted key) with electrical contacts **42*a* and 42*b***.

Data entry is accomplished through a standard PC keyboard, which allows for input of instructions and alpha numeric data Optionally a touch screen & controller allows for data entry similar to the key board. A keyboard encoder PC board accepts inputs from mechanical switches and converts them into standard keyboard signals. All data entry is via standard, common computer components 8. Display A Liquid crystal 10 Inch flat panel (LCD (VGA) monochrome) [FIGS. 2, 9] provides the means to visually see information such as key numbers, key reports etc.

A LCD controller card 48 (built in on some computers) is a printed circuit card plugging into the main compiler allowing for the proper vga signals to be sent to the LCD panel.

All of the display components are standard system components

9. Power Supply

A 50 Watt, AC input from a standard module supplying proper DC voltages to the system (+/−12 volts DC, +5 volts DC) from 110 v/220 v 50–60 Hz This is a standard universal power supply, accommodating many international voltages.

10. Housing

A Shell, base plate, miscellaneous hardware are physical, mechanical components that hold the various system components together and display them.

These were designed based on the physical size requirements of the individual components, and the desired appearance of the final system 11. Software The Microsoft Windows operating system was utilized as well as Visual Basic to generate the program code utilized in the apparatus of the invention for the process of the invention.

There are several methods, for writing instructions, telling the system what to do, how to it and when to do it (program). The prototype system to reduce the invention to practice used the combination, of Microsoft's Windows and Visual Basic to write and "run" the instructions or code to make the process of the invention operate in the unique, particular and unobvious mode of the invention.

The software of this invention (attached) permits a "learn" mode on the computer from the key identifying software program of the invention installed therein. In the learn mode an identifying (ID) number is assigned to the key, which number is subsequently installed on the computer's hard disk for storage. When the computer and the associated electo/optical equipment of this inventive system is turned on, the hard disk will load its key information into the computer's RAM. And during the learn sequence, the hard drive will back up current information in RAM.

If the key processing system is to perform a comparison, the frame grabber 45 can be configured to be in a ID mode from a key in the receptacle or an image of key transferred therein from storage. A subset of software referred to as comparison software is not part of the attached computer program, but it is obtainable as an off the shelf program. It compares the current key 40 pattern to the data base of key patterns stored in the computer's RAM. By using the key in the same position each time, software requirements for comparison are greatly simplified, since no algorithms are needed to perform repetitive bit mapping.

When a match is found, the ID is displayed on a LCD display means..

Report generating software is conventionally available as off the shelf programs. It will display and print as desired, status, history and inventory situation for one or more key IDs.

Although off the shelf software modules can be employed for the purposes of supplementing the inventive software of this invention as attached hereto. One feature of this invention encompasses the combining of all these software pieces into a single unified package for carrying out the purposes of this invention in a more convenient manner for the enhanced commercial purposes of this invention. The attached detailed software program attached to this patent application and made a part thereof does not constitute the integrated package contemplated.

THE GRID ANALYSIS

The conceptual basis for developing the inventive software for this invention, was to divide the picture area for the key 40 into two grids. One grid 42 was for the top half of the key 40 and the other was for the bottom. Within the grids, a series of preferably 12 vertical columns or units is provided.This provides 12 units spread out along the longitudinal axis of the teeth of a key. Each column will contain a separate unique portion of the key's teeth.

The number and shape of the units can be varied according to the length of the key and the number of teeth on each edge. Moreover, the units can be rectangular or square depending on the tooth configuration of the keys to be measured. Generally from 3 to 25, preferably 4 to 20 and most preferably 6 to 16 units will be employed. They are preferably in a rectangular configuration, but square will also be within the scope of the invention.

Each of these is scanned to locate the starting position of the beginning of the outline of the key profile. Each of these will generate a total of 12 different numbers comprising a coordinate. Each key will have a set of numbers comprising coordinates which is unique to it. These coordinate numbers are stored as a file name which represents an individual key .The coordinate is an electronic identifier for the processed key. Any information within this file can be used for report generation and inventorying. The software (attached hereto and made a part hereof) for executing these tasks was written in Visual Basic, a developmental tool resulting in an executable program.

In one embodiment of the invention, a miniature solid state camera 36 of the CCD (charged coupled device) with a ⅓ inch chip having a matrix structure of approximately 500×450 pixels is utilized in a receptacle means which is adapted and constructed to a accept a key, when inserted in an exterior orifice in such receptacle. These cameras are readily obtained from a variety of commercial vendors.

The Operation For the Especially Preferred Embodiment of the Invention

When key 40 has been fully inserted into aperture 32, it triggers the frame grabber 45 to obtain a picture of the tooth pattern of key 40. The tooth pattern, is obtained by fixedly placing key 40 front of the EL lamp 37 to provide a silhouette of key 40's outline The area around the key is refereed to as the image area or rather the area that the camera sees and takes a picture of. Aside from different tooth patterns, this image area is always the same.

Superimposed but not seen, is the pixel grid pattern that all computer images are made up of.

At the same time the picture is taken, a section of the inventive program measures the length of the inserted key section It does this by assigning a pixel starting point near the top of the aperture plate 41. As the over shoot block is pushed back, it creates a blank, or white area between it and the aperture plate The code tells the system to "move left" counting white pixels until it reaches a dark pixel This would now be the top of the over-shoot block.

Figure 10:
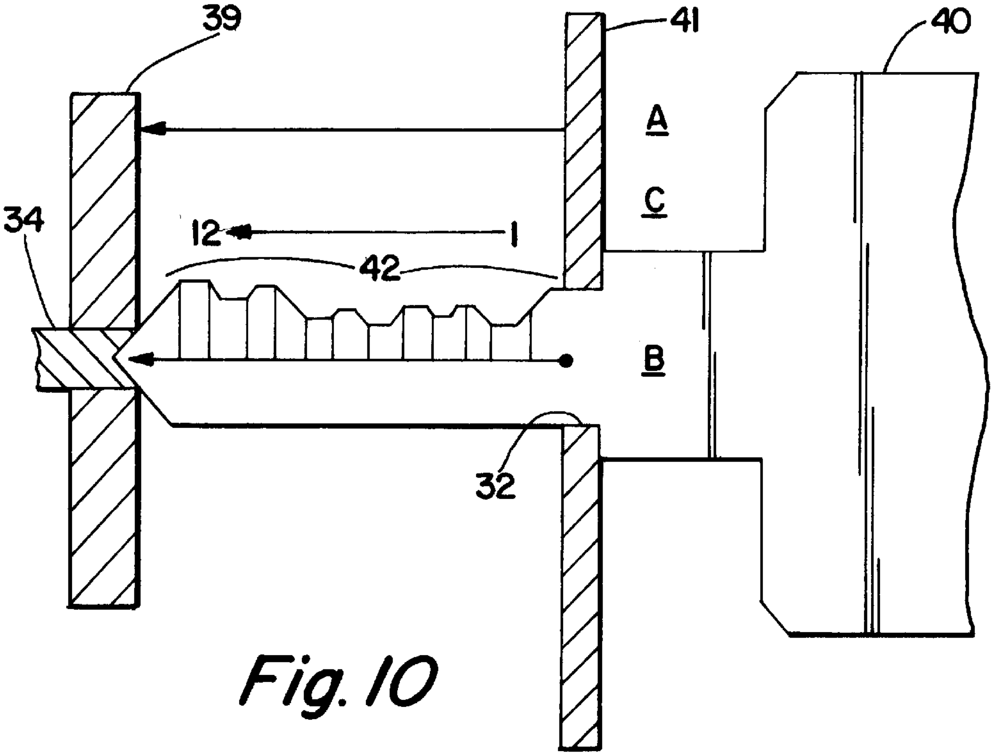
FIG. 10 is a blowup of key 40 of FIGS. 8A & 9 showing its rigid contact with receptacle plate 39 in x-section and key metal aperture wall 41 along with the sector divisors 42 emanating from the longitudinal axis of said key Another embodiment of an electronic signal generating receptacle device, containing a small micro solid state electronic camera into which a key can be placed for generating electronic picture signals has been deveoped but is not illustrated.

Let's suppose it counted 164 pixels. The algorithm located at the computer core is written to now subtract x number of pixels, let's say 20, and divide the result by 12, (144 /12=12) The number 12 represents 12 areas of the key which will be measured. The code also creates a horizontal reference line in the solid black area of the key shaft, just below the lowest tooth cut area (FIG. 10)

From the above algorithm, this line is divided into 12 points Each of the 12 points are instructed to move vertical, counting dark pixels until they reach a white pixel. When a white pixel is reached, they report the number of black pixels it took to reach the top, or the open area. Each of these 12 positions "post" their number in order. This sequence of number is the numeric code for that key This is the number that gets a alphanumeric name assigned to it by the system operator.

The algorithm can easily be changed to provide a longer numeric sequence for greater resolution In addition to "B" on the key going vertical at the 12 points, 12 points are also going negative to read the bottom side of the key. This is an option.

It was important in the inventive steps leading to the reduction to practice of the preferred embodiment of this invention in all of its embodiments to focus and analyze closely the physical features of a key.

That means some knowledge of how locks function is essential. Very simply the mechanism of causing locks to lock is to cause metal pins to protrude into the body of a lock having a lock cylinder. The presence of these pins prevents the lock cylinder from turning, thus preventing a lock from opening. When a key is inserted in a lock and turned, the pins which are of different lengths are forced to assume the same level by the projections in the edge of the key. When this happens the cylinder can turn and the lock can assume its open position.

Generally, a quality lock will have about 6 to 7 pins and 9 different possible height combinations.

It was determined that the lows and highs of the key teeth determine the necessary camera resolution. If a pin travels 0.25 inches from the lowest to the highest position, then there are 9 possible combinations. Then each possible combination can occupy 0.028 inches (0.25/9=). To encompass this variation adequately, the camera should have a pixel resolution three times better than this.

The CCD camera chosen for one preferred embodiment of this invention has a matrix structure of 500×450 pixels for a view window of 2×2 inches. This is twice the resolution required for an adequate resolution of the key's image.

Other means of producing electronic pictures are known in the machine vision art. They include scanners, linescans and matrix ccd's, encoders, styluses and scanning devices. None are preferred for this invention. Scanning for instance is marginally operable, but is considered much too slow for the commercial requirements of the inventive system.

DESCRIPTION OF ONE MECHANICAL BUT NOT PREFERRED REDUCTION TO PRACTICE EMBODIMENT

Figure 1:
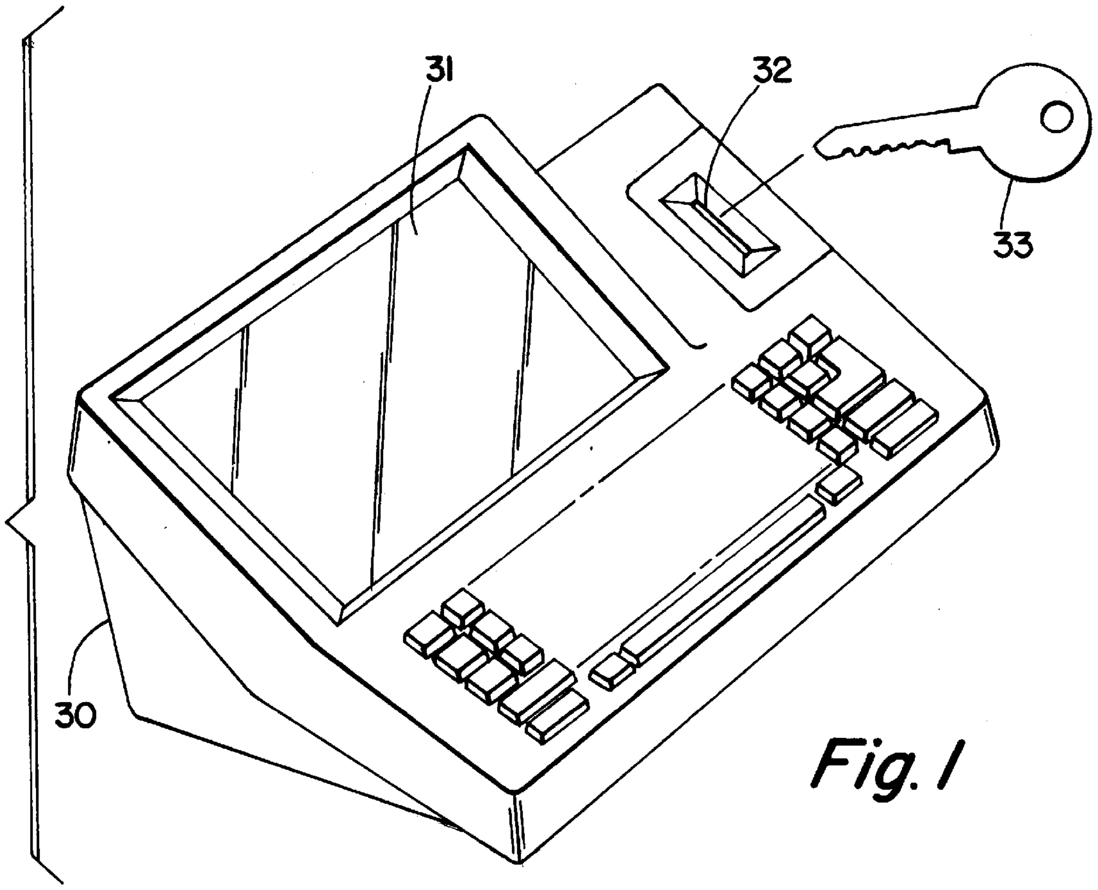
FIG. 1 is a perspective drawing of the exterior of the inventive apparatus 30 showing screen [display] 31 and slot or aperture 32 into which key 33 is to be inserted.

FIG. 1 shows a top view of key receptacle 10 with key slot 11 and switch 12. The key is inserted into slot 11 and is received by stabilizing means 13 of FIG. 2. Means 13 is characterized by two springloaded means 14 and 15, which stabilize the key so that its profile can be securely captured electronically by camera 16.

Figure 3:
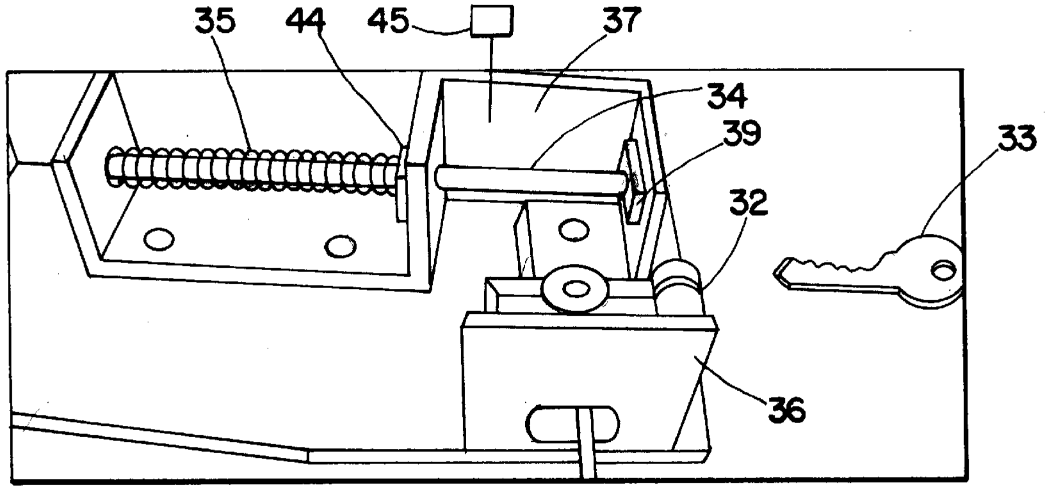
FIG. 3. shows key-handling assembly 34 containing plunger assembly 35, video camera 36 and EL lamp 37 with key 33 poised to enter key aperture 32.
Figure 4:
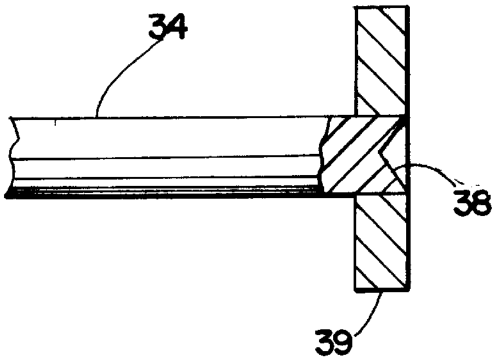
FIG. 4 is a view of spring mounted plunger assembly 35 in horizontal cross-section showing key receptacle notch 38 as a v-shaped x-section in plunger/key receptacle plate 39.
Figure 5:
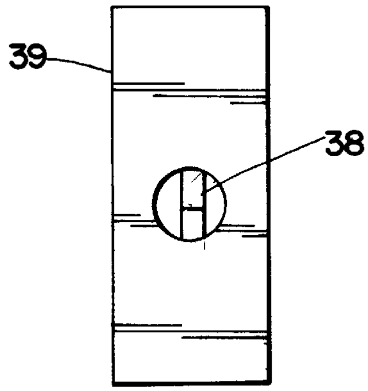
FIG. 5 is a facing view of receptacle plate 39 fixedly mounted at the end of plunger with key receptacle notch 38 shown with a rectangular x-section.

FIG. 3 shows EL Lamp 17 just behind stabilizing means 13.

DESCRIPTION OF A PREFERRED EMBODIMENT OF AN OPERATION

The mechanical and software items described above are used in a typical hotel operation using all mechanical locks with unmarked keys. The apparatus of the invention is installed at the front desk of the hotel of one hundred rooms.

To illustrate, ten unmarked keys are initially provided for each of the rooms. A storage area is provided for these keys. In this area, ten keys for each room are placed in a slot dedicated for each room. As each guest checks in he is provided a key which has previously been inserted into the active key receptacle, a read made for that key and an electronic notation is entered by the computer's inventorying software. As each guest checks out, another read is made of his returned key if proffered and the inventorying software shows that the key has been returned and gives a total for that room based on a count, which includes that returned key. That key is physically replaced in the slot after the read. This enables unmarked keys to circulate readily in the system.

At the end of each day, a physical inventory is taken of all key slots to determine whether any checked out room has less than ten keys in the slot. Replacement keys can be ordered as feasible.

Decisions can be made as to whether the room for which a key or keys is missing should be rekeyed. The important security aspect is that the missing key does not have the room number on it. And the security risks are far less than they would be had the missing key contained a key number on it.

THE COMPUTER PROGRAM LISTING TO ENABLE A COMPUTER TO CARRY OUT THE PROCEDURES AND TASKS OF THE ABOVE DESCRIBED INVENTION IS AS FOLLOWS:

```
SAFEKEY.FRM - 1


Sub Command10_Click ()
Dim a
a = 2
SET_GROSS_GAIN (a)
End Sub

Sub Command11_Click ()
Dim a
a = 3
SET_GROSS_GAIN (a)
End Sub

Sub Command12_Click ()

End Sub

Sub Command6_Click ()
'reset_cx
Dim a As Long
Dim b As Long
Dim c As Long
Dim d As Long
Dim msg
Dim logain
Dim higain
Dim X
Dim Y
Dim g As Integer
Dim spot As Integer
''''''''''''''''''''''''''''''''''''''''''''''''''''''''''
                  'set initial values
a = 460
b = 200
c = 255
d = 9
logain = 150
higain = 1
label8.ForeColor = yellow
picture1.BackColor = QBColor(0)     'clears old display
''''''''''''''''''''''''''''''''''''''''''''''''''''''''''''
SET_GAIN (logain)        'sets gain each test cycle
SET_GROSS_GAIN (higain)
''''''''''''''''''''''''''''''''''''''''''''''''''''''''''''
g = grab()    'erases video ram  - clears last grab &
display       'displays new grab
''''''''''''''''''''''''''''''''''
'cx_command = get_pixel(400, 275)
'counter1.Value = cx_command
'cx_command = put_pixel(402, 275, 255)
''''''''''''''''''''''''''''''''''''''''''''''
label8.Caption = "REMOVE KEY"
Dim j
```

SAFEKEY.FRM - 2

```
    For j = 1 To 500
    If j = 499 Then DoEvents  'DoEvents allows time to display message
    Next j
''''''''''''''''''''''''''''''''''''''''''''''''''''''''''
                 '''sets test zone = key length '''

Dim m
b = 385
Do Until a = 170
cx_command = get_pixel(a, b)
    If cx_command < 100 Then
    cx_command = put_pixel(a, b, c)
    m = a
    a = 170
    Else a = a - 1
    End If
Loop

''''''''''''''''''''''''''''''''''''''''''''''''''''''''''
               ''''TEST CYCLE BEGINS'''
'LEARN TOP OF KEY
Dim depth
Dim count As Double
Dim total As Double
Dim xy As Double
depth = 1
count = 1
total = 0
a = 460
''''''
'Draw right-hand vertical line(red)
For b = 200 To 345
picture1.PSet (a - 48, b - 195), QBColor(9)
Next b
''''
b = 200
xy = (a * b)
Do Until a = (m - 1)
cx_command = get_pixel(a, b) 'read grey level value of pixel
    If cx_command < 150 Then
       picture1.PSet (a - 50, b - 190), QBColor(12)
       total = (count * xy) \ 100

       depth = 1
       a = a - 1
       b = 200
    End If
b = b + 1
    If b = 300 Then
        a = a - 1
        b = 200
    End If
count = count + 1
depth = (depth + 20)
```

SAFEKEY.FRM - 3

```
Loop
label8.Caption = "Digi-Number = " & total
'TOP OF KEY LEARNED'''
''''''''''''''''''''''''''''''''''''''''''''''''''''''''''''''''''''''
'LEARN BOTTOM OF KEY'''
a = 460
b = 360
Do Until a = (m - 1)
cx_command = get_pixel(a, b)'read grey level value of pixel
'cx_command = put_pixel(a, b, c)
'picture1.PSet (a, b), QBColor(d)

    If cx_command < 100 Then
        ' cx_command = put_pixel(a, b, c)
        picture1.PSet (a - 50, b - 210), QBColor(12)
        a = a - 1
        b = 360
    End If
b = b - 1
    If b = 200 Then
        a = a - 1
        b = 360
    End If
Loop
'''''
For b = 200 To 345  ' draws left-hand vertical line (red)
picture1.PSet (m - 51, b - 195), QBColor(9)
Next b

'BOTTOM OF KEY LEARNED
''''''''''''''''''''''''''''''''''''''''''''''''''''''''''''
'check for key I.D. in database
Dim MYCRITERIA As String
MYCRITERIA = "diginumber = " & total
data1.Recordset.FindFirst MYCRITERIA
Beep
text1.ForeColor = red
text2.ForeColor = red
'text3.ForeColor = red
'text4.ForeColor = red
'text5.ForeColor = red
'text6.ForeColor = red
'check for key present
If m > 350 Then
    Beep
    label8.ForeColor = red
    label8.Caption = " NO KEY PRESENT ~ INSERT KEY AND RESTART "
    picture1.Cls
    text1.ForeColor = black
    text2.ForeColor = black
    'text3.ForeColor = black
    'text4.ForeColor = black
    'text5.ForeColor = black
    'text6.ForeColor = black
```

SAFEKEY.FRM - 4

```
End If
End Sub

Sub Command8_Click ()
Dim a
a = 0
SET_GROSS_GAIN (a)
End Sub

Sub Command9_Click ()
Dim a
a = 1
SET_GROSS_GAIN (a)

End Sub

Sub GAIN1_Click (index As Integer, value As Integer)
X = 0
SET_GROSS_GAIN (X)
End Sub

Sub GroupPush3D1_Click (value As Integer)
Dim a
a = 0
SET_GROSS_GAIN (a)

End Sub

Sub GroupPush3D2_Click (value As Integer)
Dim a
a = 1
SET_GROSS_GAIN (a)

End Sub

Sub GroupPush3D3_Click (value As Integer)
Dim a
a = 2
SET_GROSS_GAIN (a)

End Sub

Sub GroupPush3D4_Click (value As Integer)
Dim a
a = 3
SET_GROSS_GAIN (a)

End Sub

Sub HScroll1_Change ()

End Sub

Sub LIVEVIDEO_Click (index As Integer)
```

```
SAFEKEY.FRM - 5

erase_ram
live
End Sub

Sub mon_Click ()

End Sub

Sub Monitor_Click ()

End Sub

Sub Option3D1_Click (index As Integer, value As Integer)
Dim a
a = 1

SET_GROSS_GAIN (a)
End Sub

Sub Option3D2_Click (value As Integer)
Dim a
a = 2
SET_GROSS_GAIN (a)
End Sub

Sub Option3D3_Click (value As Integer)
Dim a
a = 3
SET_GROSS_GAIN (a)
End Sub

Sub Spin1_SpinDown ()
Dim logain
logain = 255
SET_GAIN (logain)
End Sub

Sub testkey ()
acquire
Dim a As Long
Dim b As Long
Dim c
Dim d As Long
Dim msg
Dim logain
Dim higain
Dim X
Dim Y
Dim g As Integer
Dim spot As Integer
''''''''''''''''''''''''''''''''''''''''''''''''''''''''''''''''''''
                        'set initial values
a = 460
b = 200
```

```
SAFEKEY.FRM - 6

c = 125
d = 9
logain = 50
higain = 1
picture1.BackColor = black
label8.BackColor = black
label8.ForeColor = yellow
'picture1.BackColor = QBColor(0)     'clears old display
''''''''''''''''''''''''''''''''''''''''''''''''''''''''''''
SET_GAIN (logain)        'sets gain each test cycle
SET_GROSS_GAIN (higain)
''''''''''''''''''''''''''''''''''''''''''''''''''''''''''''

g = grab()    'erases video ram  - clears last grab &
display     'displays new grab
''''''''''''''''''''''''''''''''''''
'test a pixel to read color level  - calibration only - not computed
'cx_command = get_pixel(400, 300)
'counter1.Value = cx_command
'cx_command = put_pixel(402, 300, 255)
''''''''''''''''''''''''''''''''''''''''''''
screen.MousePointer = 11 'Change MousePointer to Hourglass
command3d3.ForeColor = red
command3d3.Caption = "WAIT"
label8.BackColor = black
label8.Caption = "REMOVE KEY"
Dim j
    For j = 1 To 500
    If j = 499 Then DoEvents  'DoEvents allows time to display message
    Next j
''''''''''''''''''''''''''''''''''''''''''''''''''''''''''''
                  '''sets (test zone = key length) '''

Dim m
b = 440
a = 425
c = 255
Do Until a = 100
cx_command = get_pixel(a, b)
    If cx_command < 60 Then
    cx_command = put_pixel(a, b, c)
    m = a
    a = 100
    Else a = a - 1
    End If
Loop

''''''''''''''''''''''''''''''''''''''''''''''''''''''''''''
                ''''TEST CYCLE BEGINS'''
''''''''''''''''''''''''''''''''''''''''''''''''''''''''''''
                  'LEARN TOP OF KEY
Dim depth
Dim count As Double
Dim total As Double
```

SAFEKEY.FRM - 7

```
depth = 0
count = 0
total = 1
a = 459
''''''''''''''''''''''''''''''''''''''''''''''''''''''''''''''
'Draw right-hand vertical line
picture1.DrawWidth = 2
For b = 200 To 345
picture1.PSet (a - 1, b - 195), red
Next b
picture1.DrawWidth = 1
''''''''''''''''''''''''''''''''''''''''''''''''''''''''''''''
'Start @ upper right
Dim avera, averb, hit, K, z1
Dim READOUT As Single
avera = 0
averb = 0
hit = 1
z1 = 0
READOUT = K
b = 330
Do Until a <= m - 2
cx_command = get_pixel(a, b) 'read grey level value of pixel
'cx_command = put_pixel(a, b, 0)
'picture1.PSet (a - 33, b - 210), QBColor(6) 'filled-in key
    If cx_command >= 60 Then
     '  If hit = 70 Then
     '  cx_command = get_pixel(a, b)
     '  picture1.PSet (a - 24, b - 195), red
     '  counter2.Value = b
     '  End If
''''''''''''''''
 Dim z, f
 z = K
   'k = (b \ 20) * 20
   'k = (b \ 18) * 18
   'k = (b \ 12) * 12
   K = (b \ 10) * 10
   'k = (b \ 8) * 8
   'k = (b \ 5) * 5
   'k = (b \ 2) * 2

        picture1.PSet (a - 4, b - 190), red
        picture1.PSet (a - 4, K - 185), yellow
        cx_command = put_pixel(a, b, 255)
        total = total + K
         If z <> K Then
         z1 = z1 + 1
         READOUT = READOUT & ((K - 200) \ 10)
         Debug.Print READOUT
       End If
        'set-up next loop
        z = (z + K) / hit
        avera = avera + a
```

SAFEKEY.FRM - 8

```
        averb = averb + b
        hit = hit + 1
        depth = 0
        a = a - 3
        b = 330
    End If

b = b - 1
depth = depth + 1
count = count + 1
    If b = 200 Then
        a = a - 3
        b = 330
    End If
Loop
'f = Format(readout, E)
'Debug.Print f
'counter1.Value = count
'counter2.Value = m
'counter3.Value = m
label8.Caption = "DigiNumber = " & READOUT
'TOP OF KEY LEARNED'''
''''''''''''''''''''''''''''''''''''''''''''''''''''''''''''''''''''''''''''''''''''''''''''''
'LEARN BOTTOM OF KEY'''
a = 459
b = 324
Do Until a <= m - 2
cx_command = get_pixel(a, b)'read grey level value of pixel
'cx_command = put_pixel(a, b, 128)
'picture1.PSet (a - 33, b - 240), QBColor(6)

    If cx_command >= 70 Then
        cx_command = put_pixel(a, b, 255)
        picture1.PSet (a - 4, b - 230), yellow
        a = a - 3
        b = 324
    End If
b = b + 1
If b = 385 Then
        a = a - 3
        b = 324
    End If
Loop
'BOTTOM OF KEY LEARNED
''''''''''''''''''''''''''''''''''''''''''''''''''''''''''''''''''''''''''''
'DRAW LEFT-HAND VERTICAL LINE
picture1.DrawWidth = 2
For b = 200 To 345
picture1.PSet (m - 8, b - 195), red
Next b
picture1.DrawWidth = 1

screen.MousePointer = 0 'change mouse pointer back to arrow
command3d3.ForeColor = green 'test returns to green
```

SAFEKEY.FRM - 9

```
command3d3.Caption = "READ"
''''''''''''''''''''''''''''''''''''''''''''''''''''''''''''
'check for key I.D. in database
Dim MYCRITERIA As String
MYCRITERIA = "DIGINUMBER = " & READOUT
Debug.Print MYCRITERIA
data1.Recordset.FindFirst MYCRITERIA
Beep
text1.ForeColor = red
text2.ForeColor = red
'text3.ForeColor = red
'text4.ForeColor = red
'text5.ForeColor = red
'text6.ForeColor = red
'text7.ForeColor = red
''''''''''''''''''''''''''''''''''''''''''''''''''''''''''''
'check for key present
If m > 350 Then
    Beep
    label8.BackColor = black
    label8.ForeColor = red
    label8.Caption = " NO KEY PRESENT ~ INSERT KEY AND RESTART "
    picture1.Cls
    text1.ForeColor = black
    text2.ForeColor = black
    'text3.ForeColor = black
    'text4.ForeColor = black
    'text5.ForeColor = black
    'text6.ForeColor = black
End If

End Sub

Sub VScroll1_Change ()

End Sub

Sub Command1_Click ()
acquire
Dim a As Long
Dim b As Long
Dim c
Dim d As Long
Dim msg
Dim logain
Dim higain
Dim X
Dim Y
Dim g As Integer
Dim spot As Integer
''''''''''''''''''''''''''''''''''''''''''''''''''''''''''''
                  'set initial values
a = 390
b = 275
```

```
SAFEKEY.FRM - 10

c = 125
d = 9
logain = 200
higain = 0
picture1.BackColor = black
label8.BackColor = black
label8.ForeColor = yellow
'picture1.BackColor = QBColor(0)     'clears old display
''''''''''''''''''''''''''''''''''''''''''''''''''''''''''''
SET_GAIN (logain)        'sets gain each test cycle
SET_GROSS_GAIN (higain)
''''''''''''''''''''''''''''''''''''''''''''''''''''''''''''

g = grab()    'erases video ram  - clears last grab &
display     'displays new grab
''''''''''''''''''''''''''''''''''
'test a pixel to read color level  - calibration only - not computed
'cx_command = get_pixel(400, 300)
'counter1.Value = cx_command
'cx_command = put_pixel(402, 300, 255)
''''''''''''''''''''''''''''''''''''''''''''
screen.MousePointer = 11 'Change MousePointer to Hourglass
command3d3.ForeColor = red
command3d3.Caption = "WAIT"
'label1.BackColor = black
'label1.Caption = "REMOVE KEY"
Dim j
    For j = 1 To 500
    If j = 499 Then DoEvents  'DoEvents allows time to display message
    Next j
''''''''''''''''''''''''''''''''''''''''''''''''''''''''''''
                '''sets (test zone = key length) '''

Dim m
b = 375
a = 350
c = 255
Do Until a = 100
cx_command = get_pixel(a, b)
    If cx_command < 40 Then
    cx_command = put_pixel(a, b, c)
    m = a
    a = 100
    Else a = a - 1
    End If
Loop

''''''''''''''''''''''''''''''''''''''''''''''''''''''''''''
               ''''TEST CYCLE BEGINS'''
''''''''''''''''''''''''''''''''''''''''''''''''''''''''''''
                 'LEARN TOP OF KEY
Dim depth
Dim count As Double
Dim total As Double
```

```
SAFEKEY.FRM - 11

depth = 0
count = 0
total = 1
a = 390
''''''''''''''''''''''''''''''''''''''''''''''''''''''''''''
                    'Draw right-hand vertical line
'Picture1.DrawWidth = 2
'For b = 200 To 375
'Picture1.PSet (a + 1, b - 210), yellow
'Next b
'Picture1.DrawWidth = 1
''''''''''''''''''''''''''''''''''''''''''''''''''''''''''''
                       'Start @ upper right
Dim avera, averb, hit, K, z1
Dim READOUT As String
avera = 0
averb = 0
hit = 1
z1 = 0
READOUT = K
b = 275
Do Until a <= m + 6
cx_command = get_pixel(a, b) 'read grey level value of pixel
'cx_command = put_pixel(a, b, 255)
'Picture1.PSet (a - 0, b - 190), QBColor(6) 'filled-in key
    If cx_command >= 60 Then
       If hit = 70 Then
      cx_command = get_pixel(a, b)
      picture1.PSet (a - 0, b - 190), red

       End If
'''''''''''''''
 Dim z, f
 z = K
   'k = (b \ 20) * 20
   'k = (b \ 18) * 18
   'k = (b \ 12) * 12
   K = (b \ 10) * 10
   'k = (b \ 8) * 8
   'k = (b \ 5) * 5
   'k = (b \ 2) * 2

       'Picture1.PSet (a - 0, b - 150), red
       picture1.PSet (a - 0, K - 150), yellow
       cx_command = put_pixel(a, b, 255)
       total = total + K
        If z <> K Then
        z1 = z1 + 1
        READOUT = READOUT & ((K - 200) \ 10)
       ' Debug.Print READOUT, Val(READOUT)
      End If
       'set-up next loop
 z = (z + K) / hit
 avera = avera + a
```

23

```
SAFEKEY.FRM - 12

 averb = averb + b
 hit = hit + 1
 depth = 0
 a = a - 5
 b = 275
    End If

b = b - 1
depth = depth + 1
count = count + 1
    If b = 200 Then
        a = a - 5
        b = 275
    End If
Loop
label8.Caption = "DigiNumber = " & Val(READOUT)
'TOP OF KEY LEARNED'''
''''''''''''''''''''''''''''''''''''''''''''''''''''''''''''''''''''''''''''''
'LEARN BOTTOM OF KEY'''
'a = 390
'b = 275
'Do Until a <= m + 6
'cx_command = get_pixel(a, b)'read grey level value of pixel
''cx_command = put_pixel(a, b, 255)
''Picture1.PSet (a - 0, b - 190), QBColor(6)

    'If cx_command >= 70 Then
        ''cx_command = put_pixel(a, b, 255)
        'Picture1.PSet (a - 0, b - 190), red
        'a = a - 5
       ' b = 275
    'End If
'b = b + 1
'If b = 400 Then
'       a = a - 5
'      b = 275
'   End If
'Loop
'BOTTOM OF KEY LEARNED
''''''''''''''''''''''''''''''''''''''''''''''''''''''''''''''
'DRAW LEFT-HAND VERTICAL LINE
'Picture1.DrawWidth = 2
'For b = 200 To 385
'Picture1.PSet (m + 6, b - 210), red
'Next b
'Picture1.DrawWidth = 1
'
screen.MousePointer = 0 'change mouse pointer back to arrow
command3d3.ForeColor = green 'test returns to green
command3d3.Caption = "READ"
''''''''''''''''''''''''''''''''''''''''''''''''''''''''''''''
'check for key I.D. in database
Dim MYCRITERIA
MYCRITERIA = "DIGINUMBER = " & Val(READOUT)
```

SAFEKEY.FRM - 13

```
'Debug.Print MYCRITERIA
data1.Recordset.FindFirst MYCRITERIA
Beep
text1.ForeColor = red
text2.ForeColor = red
'text3.ForeColor = red
'text4.ForeColor = red
'text5.ForeColor = red
'text6.ForeColor = red
'text7.ForeColor = red
''''''''''''''''''''''''''''''''''''''''''''''''''''''''''''''''''
'check for key present
If m > 350 Then
    Beep
    label8.BackColor = black
    label8.ForeColor = red
    label8.Caption = " NO KEY PRESENT ~ INSERT KEY AND RESTART "
    picture1.Cls
    text1.ForeColor = black
    text2.ForeColor = black
End If
''''''''''''''''''''''''''''''''''''
End Sub

Sub Command2_Click ()
data1.Recordset.Delete
End Sub

Sub Command3_Click ()
erase_ram
live
'Dim a
'a = Shell("C:\cx100\windows\cxwin1.exe", 1)
End Sub

Sub Command3D1_Click ()
text2.ForeColor = yellow
text1.ForeColor = yellow
data1.Recordset.Edit
End Sub

Sub Command3D2_Click ()
data1.Recordset.Update
End Sub

Sub Command3D3_Click ()

acquire 'continuous write to ram  - video picture
Dim a As Long
Dim b As Long
Dim c
Dim msg
Dim logain
Dim higain
```

```
SAFEKEY.FRM - 14

Dim X
Dim Y
Dim g As Integer
Dim spot As Integer
''''''''''''''''''''''''''''''''''''''''''''''''''''''''''''
                    'set initial values
logain = 250 'Set Fine Gain 0 - 255
higain = 0   'Set Coarse Gain 0,1 or 2
picture1.BackColor = black   'clears last picture
label8.BackColor = black     'clears last message
label8.ForeColor = yellow    'Message Color
text1.ForeColor = black
'picture1.BackColor = QBColor(0)     'clears old display
''''''''''''''''''''''''''''''''''''''''''''''''''''''''''''''
SET_GAIN (logain)        'sets gain each test cycle
SET_GROSS_GAIN (higain)
''''''''''''''''''''''''''''''''''''''''''''''''''''''''''''''
g = grab()    'erases video ram  - clears last grab &
display     'displays new grab
''''''''''''''''''''''''''''''''''''
screen.MousePointer = 11 'Change MousePointer to Hourglass
label8.BackColor = black
label8.Caption = "REMOVE KEY" '
Dim j
    For j = 1 To 500
    If j = 499 Then DoEvents  'DoEvents allows time to display message
    Next j
''''''''''''''''''''''''''''''''''''''''''''''''''''''''''''''''
                  '''sets (test zone = key length) '''
Dim m, u
b = 170
a = 400 '385
c = 255
u = 1
Do Until a = 60
cx_command = get_pixel(a, b)
    cx_command = put_pixel(a, b, c)
    If cx_command < 50 Then
    cx_command = put_pixel(a, b, c)
    m = a
    a = 60
    Else a = a - 1
    u = u + 1
    End If
Loop
cx_command = put_pixel((m + 45), b, 0)
                 ''''TEST CYCLE BEGINS'''
''''''''''''''''''''''''''''''''''''''''''''''''''''''''''''''''
                  'LEARN TOP OF KEY
a = 400 '385
b = 275
'cx_command = put_pixel(a, b, 255)
Dim hit, K, z1, z
Dim READOUT As String
```

SAFEKEY.FRM - 15

```
    hit = 1
    READOUT = K
Do Until a <= m + 45 '40
 cx_command = get_pixel(a, b) 'read grey level value of pixel
     If cx_command >= 60 Then 'note: 0 = black ~ 255 = white
        cx_command = put_pixel(a, b, 255)  'this one

        z = K  'set depth zones
        K = (b \ 10) * 10
                If K <= 200 Then
                K = 200
                End If
        picture1.PSet (a - 80, K - 160), yellow  'setup only
        cx_command = put_pixel(a, b, 255)        'setup only
            If z <> K Then
                READOUT = READOUT & ((K - 200) \ 10) '200 196 186
                'Debug.Print K; B; ((K - 200) \ 10)
                picture1.Print ((K - 200) \ 10)
            End If

            ''''''set-up next loop ''''''''''''''
        a = a - 20     '15
        b = 275
    End If 'This "if-end if" only occurs when there is a "hit' i.e. the key edge
 is detected
           'If no edge is detected, the next pixel in the row (b-1)is tested for
"> 60".
 b = b - 1  'From centerline, go up 1 pixel and test again for ">60"
    If b = 190 Then
        a = a - 1            '5
        b = 275
    End If
Loop
label6.Caption = "DigiNumber = " & Val(READOUT)
label8.ForeColor = black
LABEL7.Visible = True
                    'TOP OF KEY LEARNED'''
''''''''''''''''''''''''''''''''''''''''''''''''''''''''''''
                    'check for key present

If u < 200 Then   '150
    Beep
    label8.BackColor = black
    label8.ForeColor = red
    label8.Caption = " NO TEST ~ INSERT KEY AND RESTART "
    picture1.Cls
    text1.Text = "     ?     "
    text2.ForeColor = black

End If
''''''''''''''''''''''''''''''

''''''''''''''''''''''''''''''''''''''''''''''''''''''''''''''''''''''''''''''''
screen.MousePointer = 0 'change mouse pointer back to arrow
```

SAFEKEY.FRM - 16

```
command3d3.ForeColor = green '"READ" returns to green
command3d3.Caption = "READ"
''''''''''''''''''''''''''''''''''''''''''''''''''''''''''''
                'check for key I.D. in database
Dim MYCRITERIA
MYCRITERIA = "DIGINUMBER = " & Val(READOUT)
data1.Recordset.FindFirst MYCRITERIA
Beep
text1.ForeColor = red
text2.ForeColor = red
'Do While Not Data1.Recordset.NoMatch
    If data1.Recordset.NoMatch Then
        Dim response
        text1.Text = "?"
        msg = " Key Not Found  -  Add to Database?"
        response = MsgBox(msg, 36, "KEYLIST")
            If response = idno Then
                picture1.Cls
                erase_ram
                live
                text1.ForeColor = black
                text2.ForeColor = black
                picture1.BackColor = black
                label8.BackColor = black
                label8.ForeColor = yellow
                label8.Caption = "INSERT KEY AND HOLD ~ CLICK ON 'READ'"
                command3d3.SetFocus

            Else

            text1.ForeColor = red
            data1.Recordset.AddNew
            data1.Recordset.Fields("diginumber") = Val(READOUT)
            text1.ForeColor = red
            text1.SetFocus
            label8.ForeColor = yellow
            label8.BackColor = black
            label8.Caption = " Enter Room Number and Save Entry"
            command3d5.Visible = True
            End If
    End If

End Sub

Sub Command3D4_Click ()
text1.ForeColor = red
text2.ForeColor = red

data1.Recordset.AddNew
Dim msg As String
msg = "PLEASE ENTER ROOM NUMBER"
MsgBox msg
End Sub
```

SAFEKEY.FRM - 17

```
Sub Command3D5_Click ()
data1.Recordset.Update
'label1.Visible = False
picture1.Cls
erase_ram
live
text1.ForeColor = black
text2.ForeColor = black
picture1.BackColor = black
label8.BackColor = black
label8.ForeColor = yellow
label8.Caption = "INSERT KEY AND HOLD ~ CLICK ON 'READ'"
command3d5.Visible = False
command3d3.SetFocus

End Sub

Sub Command3D6_Click ()
PANEL3D3.Visible = False
panel3d4.Visible = False
command3.Visible = False
picture1.Visible = False
command3d6.Visible = False
End Sub

Sub Command3D8_Click ()
picture1.Cls
erase_ram
live
text1.ForeColor = black
text2.ForeColor = black
picture1.BackColor = black
label8.BackColor = black
label8.ForeColor = yellow
label8.Caption = "INSERT KEY AND HOLD ~ CLICK ON 'READ'"
command3d3.SetFocus
End Sub

Sub Command4_Click ()
PANEL3D3.Visible = False
panel3d4.Visible = False
End Sub

Sub Command7_Click ()
acquire 'continuous write to ram  - video picture
Dim a As Long
Dim b As Long
Dim c
Dim msg
Dim logain
Dim higain
Dim X
Dim Y
Dim g As Integer
```

```
SAFEKEY.FRM - 18

Dim spot As Integer
''''''''''''''''''''''''''''''''''''''''''''''''''''''''
                    'set initial values
logain = 190  'Set Fine Gain 0 - 255
higain = 0     'Set Coarse Gain 0,1 or 2
picture1.BackColor = black    'clears last picture
label8.BackColor = black      'clears last message
label8.ForeColor = yellow     'Message Color
text1.ForeColor = black
'picture1.BackColor = QBColor(0)     'clears old display
''''''''''''''''''''''''''''''''''''''''''''''''''''''''
SET_GAIN (logain)         'sets gain each test cycle
SET_GROSS_GAIN (higain)
''''''''''''''''''''''''''''''''''''''''''''''''''''''''
g = grab()    'erases video ram  - clears last grab &
display      'displays new grab
''''''''''''''''''''''''''''''
screen.MousePointer = 11 'Change MousePointer to Hourglass
label8.BackColor = black
label8.Caption = "REMOVE KEY" '
Dim j
    For j = 1 To 500
    If j = 499 Then DoEvents  'DoEvents allows time to display message
    Next j
''''''''''''''''''''''''''''''''''''''''''''''''''''''''
                  '''sets (test zone = key length) '''
Dim m, u
b = 350
a = 380
c = 255
u = 1
Do Until a = 100
cx_command = get_pixel(a, b)
    'cx_command = put_pixel(A, B, c)
    If cx_command < 30 Then
    cx_command = put_pixel(a, b, c)
    m = a
    a = 100
    Else a = a - 1
    u = u + 1
    End If
Loop
cx_command = put_pixel((m + 25), b, 0)
                ''''TEST CYCLE BEGINS'''
''''''''''''''''''''''''''''''''''''''''''''''''''''''''
                  'LEARN TOP OF KEY
Dim hit, K, z1, z
Dim READOUT As String
    hit = 1
    READOUT = K
    a = 380
    b = 275
Do Until a <= m + 25      '12
 cx_command = get_pixel(a, b) 'read grey level value of pixel
```

SAFEKEY.FRM - 19

```
      If cx_command >= 60 Then 'note - 0 = black ~ 255 = white
         z = K  'set depth zones
         K = (b \ 10) * 10
                    If K <= 200 Then
                    K = 200
                    End If
         picture1.PSet (a - 80, K - 160), yellow  'setup only
         cx_command = put_pixel(a, b, 255)        'setup only
            If z <> K Then
               READOUT = READOUT & ((K - 200) \ 10) '200 196 186
               'Debug.Print K; B; ((K - 200) \ 10)
               picture1.Print ((K - 200) \ 10)
            End If

            ''''''set-up next loop ''''''''''''''
         a = a - 15
         b = 275
    End If 'This "if-end if" only occurs when there is a "hit' i.e. the key edge
 is detected
            'If no edge is detected, the next pixel in the row (b-1)is tested for
 "> 60".
 b = b - 1  'From centerline, go up 1 pixel and test again for ">60"
    If b = 190 Then
        a = a - 15
        b = 275
    End If
Loop
label6.Caption = "DigiNumber = " & Val(READOUT)
label8.ForeColor = black
LABEL7.Visible = True
                    'TOP OF KEY LEARNED'''
''''''''''''''''''''''''''''''''''''''''''''''''''''''''''
                    'check for key present

If u < 150 Then
    Beep
    label8.BackColor = black
    label8.ForeColor = red
    label8.Caption = " NO TEST ~ INSERT KEY AND RESTART "
    picture1.Cls
    text1.Text = "     ?     "
    text2.ForeColor = black

End If
''''''''''''''''''''''''''''''

''''''''''''''''''''''''''''''''''''''''''''''''''''''''''''''''''''''''''''''''
screen.MousePointer = 0 'change mouse pointer back to arrow
command3d3.ForeColor = green '"READ" returns to green
command3d3.Caption = "READ"
''''''''''''''''''''''''''''''''''''''''''''''''''''''''''
                'check for key I.D. in database
Dim MYCRITERIA
MYCRITERIA = "DIGINUMBER = " & Val(READOUT)
```

SAFEKEY.FRM - 20

```
data1.Recordset.FindFirst MYCRITERIA
Beep
text1.ForeColor = red
text2.ForeColor = red
'Do While Not Data1.Recordset.NoMatch
    If data1.Recordset.NoMatch Then
        Dim response
        text1.Text = "?"
        msg = " Key Not Found  -  Add to Database?"
        response = MsgBox(msg, 36, "KEYLIST")
            If response = idno Then
                'label1.Visible = False
                picture1.Cls
                erase_ram
                live
                text1.ForeColor = black
                text2.ForeColor = black
                picture1.BackColor = black
                label8.BackColor = black
                label8.ForeColor = yellow
                label8.Caption = "INSERT KEY AND HOLD ~ CLICK ON 'READ'"
                command3d3.SetFocus
            'End If
            Else
            ' response = idyes
             text1.ForeColor = red
            data1.Recordset.AddNew
            data1.Recordset.Fields("diginumber") = Val(READOUT)
            text1.ForeColor = red
            text1.SetFocus
            label8.ForeColor = yellow
            label8.BackColor = black
            label8.Caption = " Enter Room Number and Save Entry"
            'label1.Visible = True
            command3d5.Visible = True
            'End If
            End If
   End If

   'Data1.Recordset.FindNext criteria
'Loop
'text1.ForeColor = BLACK
'text2.ForeColor = red


'Dim msg As String
'msg = "PLEASE ENTER ROOM NUMBER"
'MsgBox msg
        'Data1.Recordset.Edit    ' Open record.
        'Data1.Recordset.Fields("Title") = NewTitle  ' Enter new title.
        'Data1.Recordset.Update  ' Save changes.

''''''''''''''''''''''''''''''''''''''''''''''''''''''''''
                    'check for key present
```

SAFEKEY.FRM - 21

```
'If u < 150 Then
'    Beep
 '   label8.BackColor = BLACK
 '   label8.ForeColor = red
 '   label8.Caption = " NO TEST ~ INSERT KEY AND RESTART "
 '   PICTURE1.Cls
 '   text1.ForeColor = BLACK
 '   TEXT2.ForeColor = BLACK
'End If
''''''''''''''''''''''''''''''


End Sub

Sub DBASE_Click (index As Integer)
PANEL3D3.Visible = True
panel3d4.Visible = True
command3.Visible = True
picture1.Visible = True
command3d6.Visible = True
End Sub

Sub exit_Click (index As Integer)
End
End Sub

Sub Form_KeyPress (KEYASCII As Integer)
KEYASCII = f2
 If KEYASCII = f2 Then
  testkey
 End If

End Sub

Sub Form_Load ()
    'Initializes the library, and determines what frame
    'grabbers are available.
    Dim liberr As Integer
    Dim i As Integer
    Dim Title As String

    Title = "CX100 Library Initialization"
    liberr = init_library()
  '  Select Case liberr
  '      Case 0
  '          For i = 7 To 0 Step -1
  '              If (select_fg(i) <> 0) Then
  '                  btnSelectFg(i).Enabled = False
  '              End If
  '          Next i
  '          i = current_fg()
          ' btnSelectFg(i).FontBold = True
          ' btnSelectFg(i).FontSize = 9.75
```

SAFEKEY.FRM - 22

```
        ' Case 1
            ' MsgBox "No free memory segments", 4144, title
        '       Unload frmCX100VBDemo
        '   Case 2
        '       MsgBox "No CX100 frame grabbers found", 4144, title
        '       Unload frmCX100VBDemo
        '   Case 3
        '       MsgBox "Frame grabber cannot be mapped into memory", 4144, title
        '       Unload frmCX100VBDemo
        '   Case Else
        '       MsgBox "Unknown library initialization error.", 4144, title
        '       Unload frmCX100VBDemo
    ' End Select
text1.ForeColor = black
text2.ForeColor = black
'text3.ForeColor = &H400000
'text4.ForeColor = &H400000
'text5.ForeColor = &H400000
'text6.ForeColor = &H400000
'text7.ForeColor = &H400000

End Sub

Sub Text1_KeyPress (KEYASCII As Integer)
     KEYASCII = Asc(UCase(Chr(KEYASCII)))
End Sub

Sub Timer1_Timer ()
If command3d5.Visible = True Then
   command3d5.ForeColor = red
   label8.ForeColor = yellow
   Dim j
    For j = 1 To 20000
    If j = 100 Then DoEvents  'DoEvents allows time to display message
    Next j
End If
command3d5.ForeColor = black
'label8.ForeColor = yellow
'End If
End Sub
```

What is claimed is:

1. An electromechanical device constituting a key identifying scheme for identifying and inventorying unmarked keys, so that they can be used in a continual unmarked condition with the objective that one finding a missing key will not know which lock it will open, comprising in combination the following elements:

a key recognizing device, which identifies keys by the irregularities at their edges or pattern of orifices therein and transmits an electronic signal specific for any key identified;

means for collecting electronic signals from such device;

means for identifying keys generating such signals; and means for inventorying keys based solely on said signals and without any aid from markings on said keys.

2. The article of claim 1 in which the signal collecting means is provided by a frame grabber means operatively associated with suitable computer software and a computer directed by such software.

3. The article of claim 1 in which the key recognizing means is an electronic camera.

4. The process of maintaining an inventory of unmarked keys, which comprises the steps of:

a) creating a store of unmarked keys for each of several locks;

b) causing each of said unmarked keys that passes to or from said store to generate a signal based solely on the irregular edge configuration of said keys, wherein said signal characterizes and identifies said key;

c) maintaining an inventory of said keys based on said signals; and d) issuing said keys can to selected parties all in such a manner that missing keys cannot be readily identified with the rooms or units they can unlock.

5. The process of identifying and labeling keys, having teeth, with electronic means so that no identification physically appears on such keys, but such physically unmarked key can always be identified by the process of the invention which comprises the steps in combination of:

a) forming am electronic image of a key while positioned in its longitudinal mode;

b) electronically transposing such image into a silhouette of said key;

c) whereby said silhouette is caused to appear on a computer monitor screen comprising a multitude of dark and light dots;

d) dividing that portion of the silhouette of said key corresponding to said teeth into a multiplicity of units;

e) counting the number of dark dots and the number of light dots within each of said units;

f) generating a digital number corresponding to that combination of light and dark dots for each of said unit; and recording the total quantity of digital numbers for each unit to be representative of each key.

6. The process of claim 5 wherein said silhouette is generated by a fame grabber.

7. The process of claim 5 wherein said light dots and dark dots are pixels on the monitor of a computer.

8. The process of claim 5 wherein the number of units is between 4 and 20.

9. The process of claim 5 wherein the number of units is between 6 and 15.

10. The process of claim 5 wherein said units are configured as single units across the longitudinal direction of the key's teeth.

11. The process of claim 10, wherein said units are shaped as parallelograms with an open top.

* * * * *